(12) United States Patent
Isip, Jr.

(10) Patent No.: US 6,304,876 B1
(45) Date of Patent: Oct. 16, 2001

(54) METHOD FOR ENFORCING INTEGRITY CONSTRAINTS IN A DATABASE TABLE USING AN INDEX

(75) Inventor: Amando B. Isip, Jr., Richardson, TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/092,683

(22) Filed: Jun. 5, 1998

(51) Int. Cl.[7] ................................................ G06F 17/30
(52) U.S. Cl. ............................ 707/100; 707/2; 707/8; 707/102; 707/201
(58) Field of Search ............................. 707/2, 3, 8, 100, 707/102, 201

(56) References Cited

U.S. PATENT DOCUMENTS

| | | | |
|---|---|---|---|
| 4,933,848 | 6/1990 | Haderle et al. | 364/300 |
| 5,133,068 | 7/1992 | Crus et al. | 364/200 |
| 5,222,235 | 6/1993 | Hintz et al. | 395/600 |
| 5,226,158 | 7/1993 | Horn et al. | 395/600 |
| 5,261,093 | 11/1993 | Asmuth | 395/600 |
| 5,267,346 | 11/1993 | Maruyama et al. | 395/10 |
| 5,386,557 | 1/1995 | Boykin et al. | 395/600 |
| 5,408,657 | 4/1995 | Bigelow et al. | 395/600 |
| 5,430,871 | 7/1995 | Jamoussi et al. | 395/600 |
| 5,488,722 | 1/1996 | Potok | 395/600 |
| 5,499,359 | 3/1996 | Vijaykumar | 395/600 |
| 5,513,350 | 4/1996 | Griffen et al. | 395/600 |
| 5,546,576 | 8/1996 | Cochrane et al. | 395/600 |
| 5,553,218 * | 9/1996 | Li et al. | 707/102 |
| 5,566,330 | 10/1996 | Sheffield | 395/600 |
| 5,652,882 | 7/1997 | Doktor | 395/617 |
| 5,675,779 | 10/1997 | Doktor | 395/604 |
| 5,680,614 | 10/1997 | Bakuya et al. | 395/614 |
| 5,706,494 | 1/1998 | Cochrane et al. | 707/2 |
| 5,745,896 * | 4/1998 | Vijaykumar | 707/100 |
| 5,873,075 * | 2/1999 | Cochrane et al. | 707/2 |
| 5,899,993 * | 5/1999 | Jenkins, Jr. | 707/9 |
| 5,950,188 * | 9/1999 | Wildermuth | 707/3 |
| 5,950,210 * | 9/1999 | Nelson | 707/203 |

OTHER PUBLICATIONS

Yoon, J.P., "Semantic update optimization in active databases", Database Applications Semantics, Proc. of the IFIP WG 2.6 Working Conf. on DB Appl Semantics, Jun. 1995, Abstract Only.*

Baralis, E. et al., "Declarative specification of constraint maintenance", Entity–Relationship Approach—ER '94, 13th Int'l Conf. on ER Approach Proc., Dec. 1994, Abstract Only.*

Yoon, J. P., "Database updates using active rules: a unified approach for consistency maintenance", Database Systems for Advance Applications, '93 Proc. 3d Int'l Symp. on DB, 1993, Abstract Only.*

* cited by examiner

*Primary Examiner*—Jean R. Homere
(74) *Attorney, Agent, or Firm*—Baker & McKenzie (57) ABSTRACT

Constraint enforcement identifies rows containing a value violating a constraint. A SQL DELETE statement is generated for each row violating the constraint utilizing an index value associated with each row. Initialization of a CHECK utility performing constraint enforcement includes identifying an index defined for the table to be checked as well as the column name for the index value to facilitate generation of the SQL DELETE statements using the index column name and value. Generating the SQL delete statement utilizing an index value associated with each row in the database table rather than by utilizing the value causing the constraint violation eliminates the need to read the entire database table to execute the DELETE statement.

16 Claims, 5 Drawing Sheets

| ORDER-NUMBER | RID |
|---|---|
| 11111 | 0000201 |
| 22222 | 0000202 |
| 33333 | 0000203 |
| 44444 | 0000204 |

221 — row 1, 222 — row 2, 223 — row 3, 224 — row 4

METHOD FOR ENFORCING INTEGRITY CONSTRAINTS IN A DATABASE TABLE USING AN INDEX

FIELD OF THE INVENTION

The present invention relates to database management systems, and particularly to a method for enforcing integrity constraints in a database table using an index of the database table.

BACKGROUND INFORMATION

A well known database software program is DATABASE 2 (DB2) database software distributed by IBM Corporation. As is known in the art, DB2 operates as a subsystem in a computer system operating under the IBM MVS operating system software. In a DB2 environment, user data resides in DB2 tables which are in tablespaces. A tablespace is, for example, a portion of storage space in a direct access storage device (DASD) such as a disk drive. For exemplary purposes, illustrated below is an order_entry table that would be stored in a tablespace. The order_entry table contains columns: customer_number; product_code; order_number; buyer_name; and ship_to_zip.

| Order_Entry Table | | | | |
|---|---|---|---|---|
| customer_number | product_code | order_number | buyer_name | ship_to_zip |
| 1111111111 | 0010 | 1234500001 | John Doe | 60606 |
| 1111111111 | 0040 | 1234500002 | Jane Doe | 70707 |
| 3333333333 | 0020 | 1234500003 | Bill Smith | 90909 |
| 2222222222 | 0030 | 1234500004 | Fred Smith | 80808 |

While the above Order_Entry table shows four rows, the table could have millions of rows for all the orders of a company, for example 4 million rows. The order_entry table also has, for example, three index keys and two foreign keys. An index key is an identifier for a particular row of a table while a foreign key also identifies a row but is also used for referential integrity as described below. For example, in the order_entry table, one index key could be based on Order_Number, another index key based on buyer_name and a third index key based on ship_to_zip. As is known in the art, an index key for a particular table indicates a row identification (RID) and a selected value for the row (e.g., the index key value).

The index key can be used to generate an index for the table which facilitates subsequent searches for particular data in the table. For example, the Order_Entry table would have three indexes (e.g., one for each index key), each index being stored in an indexspace. Similar to a tablespace, an indexspace is, for example, a designated portion of a DASD. Thus, if a user was looking for rows that contain a particular buyer name in the Order_Entry table, the database management system could query the buyer index for the table to identify all occurrences of the buyer name without reading the entire table to locate the rows.

DB2 administrators analyze performance characteristics for application programs that access a database table in an attempt to find the optimum index structure for fast access to the database table. The values to be used as an index must be carefully selected because each index results in overhead for the database system. For example, each transaction in a database table, such as an add or delete, requires that each index for the table also be updated. Thus, it is desirable that the number of indexes for a table be minimized to enhance the performance of application programs. The values to be used as an index for a database table are selected based on, for example, data accessed most frequently by users of the table, generally on-line transaction users. Index keys generally are not based on foreign keys, as foreign keys are used primarily for validation purposes (e.g., constraint enforcement).

As is known in the art, each table in a database may be either a parent table, a child table or both. A child table is related to a parent table via the foreign key value or values contained in columns of the child table. For example, a foreign key value can appear multiple times in a child table (e.g., multiple rows in a child table can have the same foreign key, such as the customer_number and product_code entries in the order_entry table) but each foreign key must be associated with a unique key in a parent table of the child table.

Referential integrity ensures that every foreign key value is valid (e.g., has a corresponding primary key in a parent table). Thus, referential integrity (RI) means that a value in the column of a row in the table is valid when this value also exists in an index of another table. A row should not be in a table if it violates a constraint. As the order_entry table illustrated above has two foreign keys, it has a RI constraint on customer_number and product_code. As is known in the art, when a user of a DB2 database management system creates a table, the user also defines the constraints for the table (e.g., the user can define the relational integrity criteria). Illustrated below are an exemplary product table and an exemplary customer table (e.g., the parent tables for the foreign keys in the order_entry table).

| Product Table | | |
|---|---|---|
| product_code | product_description | retail_price |
| 00010 | laptop pc | 1000.00 |
| 00020 | desktop pc | 1100.00 |
| 00030 | office pc | 1200.00 |
| 00040 | lan pc | 3500.00 |
| 00050 | home pc | 999.99 |

The product table show five rows, although the table could have thousands of rows for all of the different products of a company. The product table has, for example, an index based on the column product_code, which values are illustrated in ascending order. The values in the column product_code are each unique since there is only one product code assigned to each product and thus in this table, a product code would not be included more than once. Accordingly, an index for the product table would include the key value (e.g., the stored value in the product_code column) and a RID. The product table index would reside in a DB2 indexspace.

The customer table illustrated below shows four rows, although this table could also have thousands of rows for all of the customers of a company. The customer table has, for example, an index based on the column customer_number, which values are illustrated in ascending order. The values in the column customer_number are each unique since there is only one customer number assigned to each customer name and thus a customer number would not be included in this table more than once. Accordingly, an index for the customer table would include the key value (e.g., the value of the column customer_number) and a RID. The customer index would also reside in a DB2 indexspace.

Customer Table

| customer_number | buyer_name | customer_address |
|---|---|---|
| 1111111111 | John Doe | State A |
| 2222222222 | Fred Smith | State B |
| 3333333333 | Bill Smith | State C |
| 4444444444 | Steve Jones | State D |

As shown by the above tables, all of the rows in the Order_Entry table are valid (e.g., there are no referential integrity constraint violations) because the foreign key values in the column product_code of the Order_Entry table also exist in the product table and the values in the column customer_number of the Order_Entry table also exist in the customer table.

Conventional database management systems, such as DB2, provide the user with the ability to identify specific conditions that a row must meet before it can be added to a table. These conditions are referred to as "constraints" because they constrain the values that a row may include. Constraints include, for example, check constraints and referential integrity constraints. Check constraints include, for example, qualifying criteria for a particular value, such as a zip code value (e.g., the ship_to_zip value in the Order_Entry table) being in the range of 00000 to 99999. As discussed above, referential integrity constraints ensure that a value in a row of a table is valid when the value also exists in an index of another table.

Constraint enforcement can be performed prior to loading of data into a database table or after data has already been loaded into a database table. An example of performing constraint enforcement prior to loading data into a database table is provided in co-pending application Ser. No. 09/058,754 filed Apr. 10, 1998, owned by the Assignee of the present application and which is hereby expressly incorporated by reference. If constraint enforcement is performed after loading data into a database table, for example as part of a recovery operation following a hardware of software failure, the constraint enforcement is generally performed by a CHECK utility, such as CHECK DATA by IBM Corp., CHECK PLUS by BMC Software and FASTCHECK by Platinum technology, inc.

Conventional CHECK utilities ensure that data in the table do not violate any constraints that have been established for the table. Constraints can be established at the time the table is generated. For example, constraints can be defined when the table is originally created in the database system and are stored in the DB2 catalog, which can be subsequently queried by a CHECK utility to identify the constraint information.

To perform constraint enforcement, a conventional CHECK utility would, for example, be initialized and identify any applicable constraints for the table to be checked by reading the DB2 catalog, as is known in the art. The CHECK utility would, for example, then read each row of the database table and check for check constraint violations and/or referential integrity constraint violations.

Constraints may be violated for numerous reasons, not all of which require that the row containing the error be deleted. For example, a user might want to correct the error rather than delete the row. An option with some CHECK utilities, such as CHECK PLUS by BMC Software and FASTCHECK by Platinum technology is that if a constraint violation is identified, and thus a row of the database table contains an error, the CHECK utility will produce a DB2 SQL DELETE statement for each row containing a constraint violation.

These SQL DELETE statements will be written out to a sequential file which the customer can then use to selectively delete particular rows that are in violation of the constraint(s). For example, in the Order_Entry table illustrated above, a data entry error in the customer_number would not render the order invalid but rather may reflect an error that can be corrected, thus allowing continued processing of the order (e.g., it may be more desirable to fix the error than delete the row).

Other conventional CHECK utilities, such as the IBM CHECK DATA utility, do not generate SQL DELETE statements but do include an option to delete all of the rows in error. A disadvantage of this approach, however, is that the user has no way of individually selecting the particular error rows to be deleted.

The SQL DELETE statements generated by conventional CHECK utilities are based on the foreign key value that violates the constraint. For example, when the SQL DELETE statement is generated by the CHECK utility, the statement uses the key value causing the constraint violation. For example, if the customer number 99999 was read by a CHECK utility while checking the Order_Entry table illustrated above and the customer number 99999 violated a referential integrity constraint (e.g., it was not in a parent index for the parent customer table), then the CHECK utility would generate a SQL DELETE statement using the foreign key value that violated the constraint (i.e., customer number=99999).

Thus, when the SQL DELETE statement is generated using a key value that is not indexed for the table and is executed, the entire database table must be read for each DELETE statement to determine if the foreign key value identified in the SQL DELETE statement is contained in any row of the database table. As mentioned previously, generally foreign key values are not used as an index for a database table and thus no index values are available for use by the DELETE statements utilizing a foreign key value to facilitate deletion of rows containing errors. Therefore, as each DELETE statement generated by the CHECK utility deletes any row that matches the foreign key that is in error, and if the database table contains millions of rows, each of the millions of rows would have to be read for each executed DELETE statement. If even only two rows contain the key value used in the DELETE statement, all of the rows of the table would have to be read. Thus, significant processing time can be consumed as part of the constraint enforcement process due to the need to read an entire database table multiple times.

SUMMARY OF THE INVENTION

According to the present invention, SQL DELETE statements are generated for rows in a database table containing a value violating a constraint, the SQL DELETE statements utilizing an index value associated with the row containing the foreign key value that violates the constraint. Thus, instead of generating SQL DELETE statements using the value violating a constraint, which requires subsequent reading of an entire database table to determine if the foreign key value is included in any row of the database table if the value is not indexed for the table, according to the present invention the SQL delete statement utilizes an index value for a particular row in the database table, thus eliminating the need to read the entire database table to execute the DELETE statement. During initialization of a CHECK utility performing the constraint enforcement, the CHECK utility identifies an index defined for the table and the column name of the index values to facilitate generation of the SQL DELETE statements using the index column name and value.

DETAILED DESCRIPTION OF THE INVENTION

Figure 1:
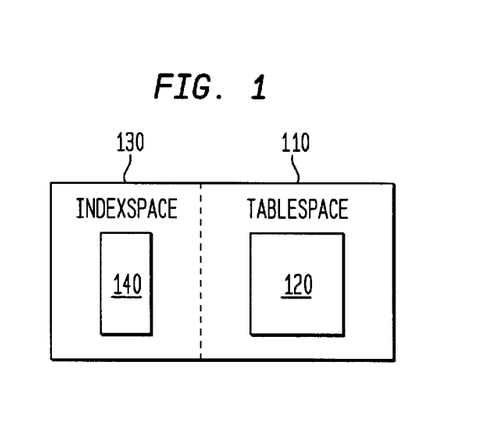
FIG. 1 illustrates an indexspace and a tablespace to be checked for constraint violations according to an exemplary embodiment of the present invention.
Figure 3:
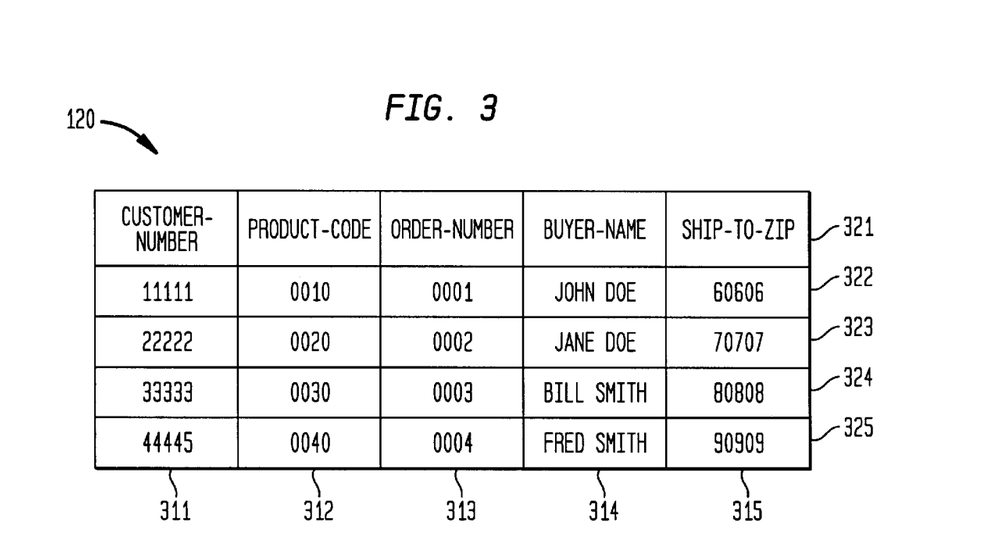
FIG. 3 is an exemplary database table according to an embodiment of the present invention.

FIG. 1 illustrates a tablespace 110 including a database table 120 and an indexspace 130 including an index 140. FIG. 3 illustrates a more detailed representation of table 120. Similar to the example Order_Entry table used earlier, table 120 includes columns 311–315 and rows 321–325 for an exemplary Order Entry table. The intersection of each column and row of table 120 contains an entry, which may be a unique or non-unique value. For example, column 311 contains the customer_number entries, which may be non-unique values as the same customer may have multiple orders pending in the Order_Entry table 120. Column 313 of table 120 contains order_number entries, each of which is a unique value as each order placed by a customer is assigned a unique number. Also as shown in FIG. 3, column 312 in table 120 contains product_code entries, column 314 contains buyer_name entries and column 315 contains ship_to_zip entries, all of which are non-unique values.

Figure 2:
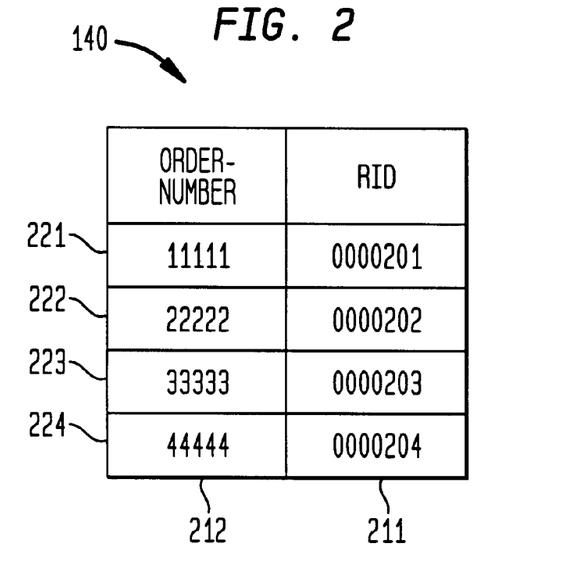
FIG. 2 is an exemplary index according to an embodiment of the present invention.

FIG. 2 illustrates a more detailed representation of index 140. Index 140 illustrates an index for table 120 on the order_number column 313 of table 120. Accordingly, index 140 includes two columns 211 and 212 containing, respectively, a row identification (RID) and associated index value, in this case the order_number entries for rows 322–325 of table 120. The order_number column is selected as an index for the Order_Entry table 120 because, for example, it is not a foreign key value for table 120 and the order numbers are each unique values. The ship to zip or buyer_name columns could also be used as index values for table 120. Index 140 is defined, for example, after the database table has been created and a database administrator has conducted some conventional performance analysis on the table, for example evaluating the most commonly accessed values of the database table by on-line users, to determine which column of the table should be selected for the index 140.

Figure 4:
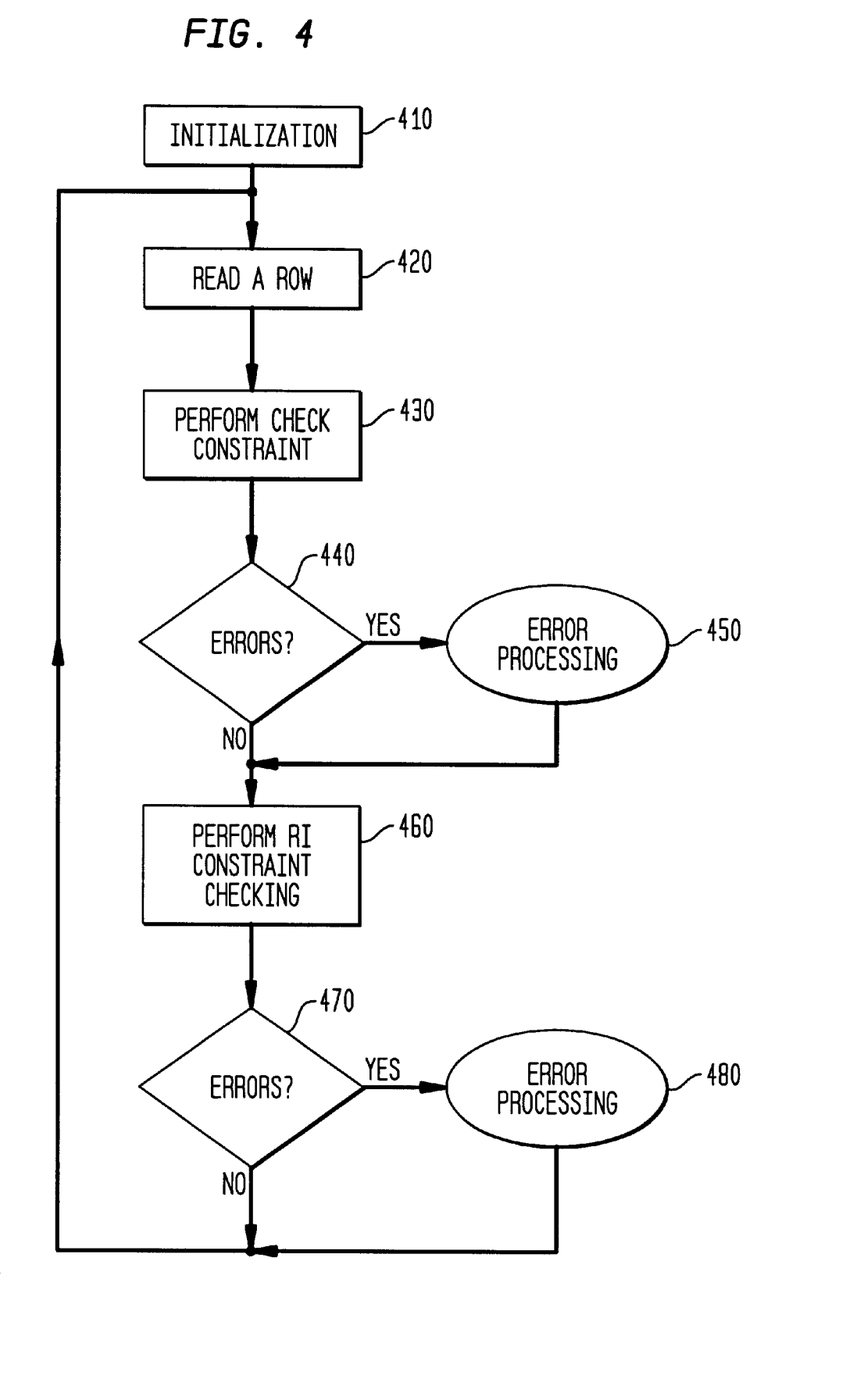
FIG. 4 is an exemplary flowchart for enforcing constraints according to an embodiment of the present invention.

FIG. 4 illustrates an exemplary flowchart for a method of enforcing constraints according to an embodiment of the present invention. In step 410, a CHECK utility is initialized to enforce constraints on a database table, such as table 120 illustrated in FIG. 2. As is known in the art CHECK utilities are generally initialized each time a tablespace is to be checked. The CHECK utility could include, for example, CHECKDATA by IBM Corp., CHECK PLUS by BMC Software or FASTCHECK by Platinum technology, inc. In step 420, the CHECK utility reads a row of a database table, data already having been loaded into the database table. In step 430, check constraint enforcement is performed. Check constraint enforcement can be performed in any conventional manner.

In step 440, it is determined if there are any check constraint violations. If a check constraint violation is identified in step 440, then error processing according to an embodiment of the present invention occurs in step 450. For example, a printed report of the constraint violation is generated and a SQL DELETE statement is generated so that the row containing the constraint violation can be deleted. According to the present invention, the SQL DELETE statement is generated by the CHECK utility utilizing an index value associated with the row containing the constraint violation, which may differs from the foreign key value causing the constraint violation. In another embodiment of the present invention, the CHECK utility can also check if a DELETE statement has already been generated for the row due to a previous check constraint violation, thus avoiding generation of duplicative DELETE statements.

If no check constraint violation is identified in step 440, then in step 460, referential integrity constraint enforcement is performed. Referential integrity constraint enforcement can be performed in any conventional manner. If a referential integrity violation is detected in step 470, then error processing according to an embodiment of the present invention occurs in step 480. For example, a printed report of the constraint violation is generated and a SQL DELETE statement is generated utilizing the index value associated with the row. A check can be made to verify that a DELETE statement for the row has not yet already been generated, for example, due to a previously identified CHECK constraint violation. For example, a flag can be set in the CHECK utility when a DELETE statement is generated for a row. The status of the flag (e.g., set or not set) can be verified by the CHECK utility for each row prior to generating a DELETE statements for the row, thereby avoiding duplicative generation of DELETE statement for a particular row. After error processing in step 480 is completed, or if no referential integrity violation is identified in step 470, the process returns to read the next row in the database table at step 420, this looping continuing until each row in the database table has been reviewed for constraint violations.

Figure 5:
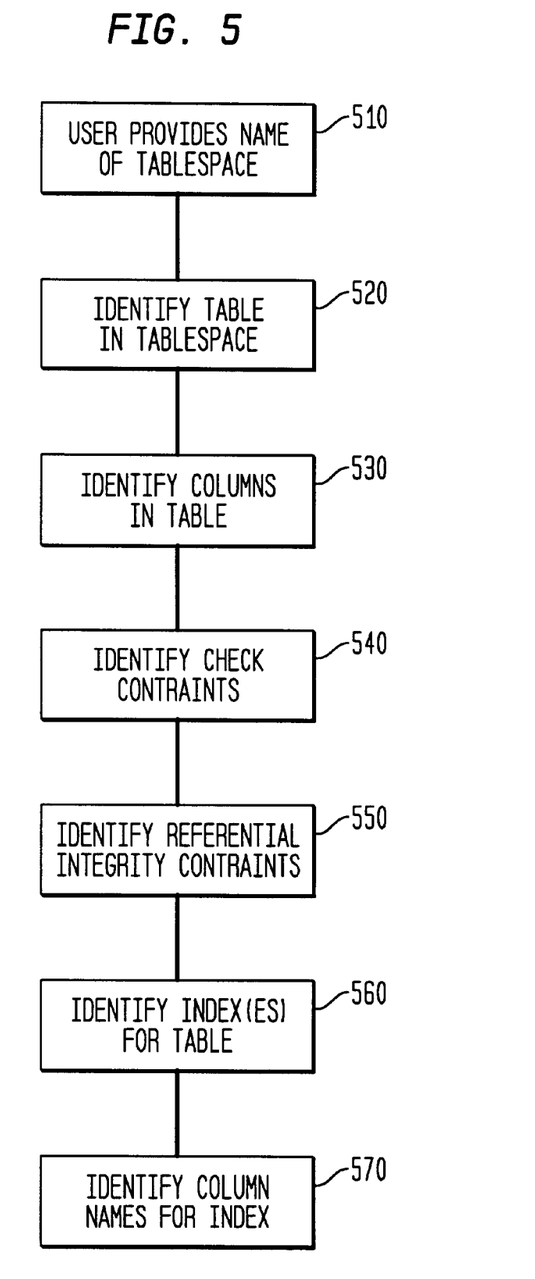
FIG. 5 is an exemplary flowchart for initialization of a CHECK utility according to an embodiment of the present invention.

FIG. 5 illustrates exemplary initialization processing of a CHECK utility according to an embodiment of the present invention, such as performed in step 410 of FIG. 4. In step 510, a user of the CHECK utility provides a name of a tablespace which is to be subject to constraint enforcement. For example, the user can input the name of the tablespace via an I/O device such as a keyboard to the computer system operating the database management system and the CHECK utility. In step 520, the CHECK utility identifies the database table located in the tablespace identified by the user, for example by reading the DB2 catalog. Usually, there is only one database table in a tablespace.

In step 530, the CHECK utility identifies the columns in the database table so that, for example, when an index is identified for the table the CHECK utility can identify the column name for the index value and locate the corresponding column in the database table to retrieve the index value to be used in generating the SQL DELETE statement according to an embodiment of the present invention. Performing this step during initialization precludes the need to identify the appropriate column in the database table each time a SQL DELETE statement is generated. Also, during the initialization process, the CHECK utility can flag the column(s) in the database table that contain index values and subsequently locate the flagged columns if there is a constraint violation to obtain the column name and value to be used in generating the DELETE statement.

In step 540, the CHECK utility identifies any check constraints that may apply to the table. Similarly, in step 550, the CHECK utility identifies any referential integrity constraints that apply to the database table. In step 560, the CHECK utility identifies the index or indexes that have been defined for the table. If only one index is defined for the table, then that index is identified by the CHECK utility. If more than one index is defined for the table, then the CHECK utility would, for example, select the index based on unique values, which can be determined via the DB2 catalog (e.g., the uniquerule data contained in the DB2 catalog). If no unique index value exists, then the CHECK utility could use, for example, the first non-unique index. In step 570, the CHECK utility identifies the column names for the index defined for the database table and identified by the CHECK utility.

Applicable check constraints can be identified by, for example, the CHECK utility reading the DB2 catalog (e.g., the SYSIBM.SYSCHECKS table in the catalog). The check constraints that apply are defined, for example, when the table is created in the database system and are stored in the DB2 catalog. The following is an example of how a conventional CHECK utility would read the SYSCHECKS table in a DB2 catalog.

```
SELECT CHECKNAME, CHECKCONDITION
   FROM SYSIBM.SYSCHECKS
   WHERE CREATOR = :#CCR_CREATOR,
   AND TBNAME = :#CCR_TBNAME;
```

If no check constraints are defined for the table, then, for example, DB2 returns to the CHECK utility a SQL code of +100. If a check constraint is defined for the table, then the DB2 catalog returns a row value identifying the check constraint. The row value is the check predicate from which check constraint routines can be compiled and built by the CHECK utility, as is known in the art.

Referential integrity constraints applicable to the table can be identified by a conventional CHECK utility by, for example, the CHECK utility reading the DB2 catalog (e.g., the SYSIBM.SYSRELS table of the DB2 catalog). The referential integrity constraints that apply are defined, for example, when the table is created in the database system and are stored in the DB2 catalog, which can be subsequently queried for the information as described above. For example, the following is exemplary code for a conventional CHECK utility to read the SYSRELS table in the DB2 catalog:

```
SELECT REFTBNAME       ,
   REFTBCREATOR        ,
   RELNAME             ,
   IXOWNER             ,
   IXNAME
FROM SYSIBM.SYSRELS
   WHERE CREATOR = :#RELS_CHILD_CREATOR,
   AND TBNAME = :#RELS_CHILD_TBNAME;
```

If no referential integrity constraints are defined for the table, then a SQL code of +100 is returned to the CHECK utility by the DB2 catalog. If a referential integrity constraint does apply to the table, however, then the DB2 catalog returns the row value for each referential integrity constraint parent table (e.g., the DB2 catalog provides the row of the SYSIBM.SYSRELS table having a column with the name of the parent table for the referential integrity constraint). More than one row can be returned by the DB2 catalog if more than one referential integrity constraint is defined for the table. The CHECK utility would then, for example, read the DB2 catalog to identify the column names for the foreign keys for the referential integrity constraints, for example by reading the SYSFOREIGNKEYS table in the DB2 catalog. Exemplary code for how a conventional CHECK utility would read the SYSFOREIGNKEYS table is set forth below:

```
SELECT
     CREATOR,
     TBNAME,
     RELNAME,
     COLNAME,
     COLSEQ
   FROM SYSIBM.SYSFOREIGNKEYS
   ORDER BY 1, 2, 3, 5;
```

If referential integrity constraints apply, the parent index for each applicable referential integrity constraint is identified by the CHECK utility. For example, the CHECK utility can read the DB2 catalog (e.g., the SYSIBM.SYSINDEX table of the DB2 catalog) for each parent table and the DB2 catalog will return the name of the parent index for the parent table. For example, the following is exemplary code for a CHECK utility to read the SYSINDEX table of the DB2 catalog:

```
SELECT
     INDEXSPACE,
     UNIQUERULE
   FROM SYSIBM.SYSINDEXES
   WHERE TBNAME= #RELS_PARENT_TBNAME,
   AND TBCREATOR = #RELS_PARENT_CREATOR;
```

In addition to the CHECK utility accessing the DB2 catalog during initialization of the CHECK utility, for example to determine if any check constraints or referential integrity constraints apply to the table, as illustrated in steps 510 to 550 of FIG. 5, the CHECK utility performs additional steps 560 and 570 during initialization in an embodiment of the present invention. As shown in FIG. 5, in step 560 the CHECK utility determines the index or indexes that have been defined for the table. The CHECK utility can determine the index or indexes by reading the DB2 catalog, for example using the SYSIBM.SYSINDEXES table in the DB2 catalog. The following is exemplary code for the CHECK utility to read the SYSINDEXES table:

```
SELECT NAME, CREATOR, UNIQUERULE
FROM SYSIBM.SYSINDEXES
WHERE TBNAME = "NAME",
    AND TBCREATOR = "NAME OF CREATOR";
```

In response to this query from the CHECK utility, the DB2 catalog will return all of the indexes that have been defined for the table. For example, there will be one row in the SYSINDEXES table for each index of the table. Using the database table illustrated in FIG. 3, DB2 would return to the CHECK utility a row from the DB2 catalog indicating that the order_number index 140 illustrated in FIG. 2 has been defined for the Order Entry table 120.

Also as shown in FIG. 5, in step 570, the CHECK utility identifies the column names for the index or indexes identifies in step 560. The CHECK utility can determine the column names by, for example, reading the SYSIBM.SYSKEYS table in the DB2 catalog. The following is exemplary code for the CHECK utility to read the SYSKEYS table:

```
SELECT COLNAME
FROM SYSIBM.SYSKEYS
WHERE IXNAME = "NAME OF INDEX",
    AND IXCREATOR = "NAME OF CREATOR";
```

Thus, using the Order_Entry table 120 example, step 570 returns to the CHECK utility the column name order_number as the column name of the index defined for database 120. As will be described below, this column name can be used by the CHECK utility to select the index value from a row containing a constraint violation to be used in generating a DELETE statement according to an embodiment of the present invention.

Figure 6:
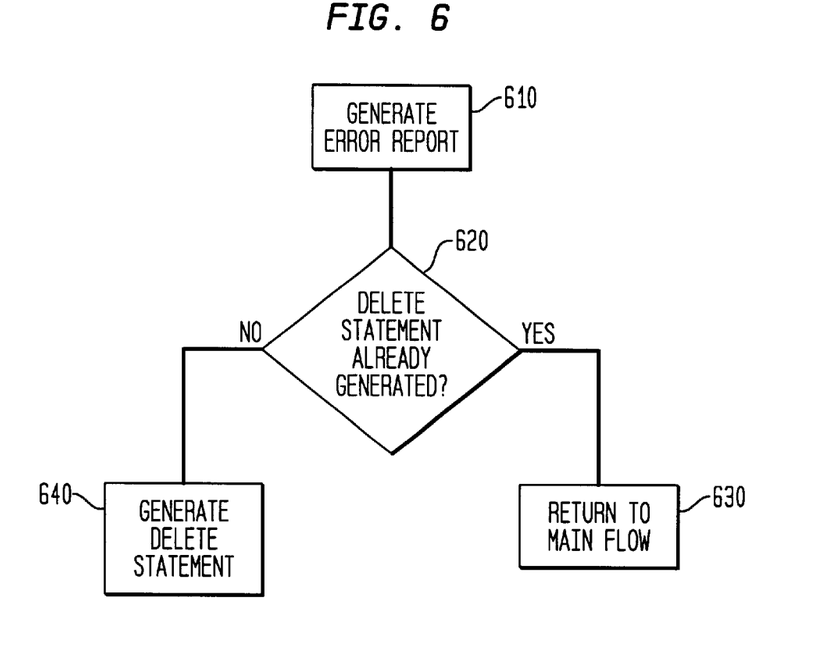
FIG. 6 is an exemplary flowchart for error processing according to an embodiment of the present invention.

FIG. 6 illustrates exemplary error processing according to an embodiment of the present invention, such as the error processing identified in step 450 of FIG. 4. If, for example, a check constraint violation is identified in steps 430 and 440 of FIG. 4, then in step 610 of FIG. 6, an error report is generated by the CHECK utility. The error report can include, for example, a printout of the row identification for the row in error and the value violating the check constraint. In step 620, the CHECK utility determines if a SQL DELETE statement has already been generated for the row. For example, a previous check constraint violation may have caused a SQL DELETE statement to be generated already and thus another DELETE statement is not required. As explained previously, a flag in the CHECK utility can be used to determine if a DELETE statement has already been generated for a particular row. If a DELETE statement has already been generated, then in step 630, the CHECK utility returns to the main processing flow, such as proceeding to step 460 in FIG. 4 to check for referential integrity or looping back to step 430 in FIG. 4 to check for additional check constraint violations. If a SQL DELETE statement has not been generated for the row containing the check constraint violation, then in step 640 a SQL DELETE statement is generated. According to an embodiment of the present invention, the SQL DELETE statement does not utilize the particular value that caused the constraint violation. Rather, the SQL DELETE statement utilizes an index value associated with the row that contains the constraint violation. An exemplary SQL DELETE statement generated according to an embodiment of the present invention has the form of

```
DELETE FROM
TABLENAME WHERE COLNAME = "INDEX VALUE";.
```

The generation of the DELETE statement according to an embodiment of the present invention is facilitated, for example, by the steps performed by the CHECK utility during initialization as described with regard to FIG. 5. For example, while conventional CHECK utilities generally perform the functions illustrated in steps 510–550 of FIG. 5, according to the present invention additional steps 560 and 570 are performed so that the CHECK utility identifies the index or indexes defined for the table to be checked as well as the column names for the index or indexes.

With this additional information, the CHECK utility can associate an index value with any row that contains a constraint violation by reading the column of the row containing the index value (e.g., identified during initialization) and using the content of that column as the index value for the generation of the SQL DELETE statement for the row. When the DELETE statements are generated they can be output to as a file that can be subsequently reviewed and particular DELETE statements selected for execution.

For example, when the CHECK utility reads the database table 120 to perform constraint enforcement, the values contained in each column of the row are available to the CHECK utility The column containing the index value is also known to the CHECK utility via the initialization process (e.g., steps 560 and 570 in FIG. 5) and thus if a constraint violation is identified, then the index value can be located in the appropriate column by the CHECK utility and used for generating the DELETE statement.

Therefore, as a result of the method according to the present invention, when the user of the database system determines that a SQL DELETE statement is to be executed, DB2 does not have to read the entire database table to identify any rows containing the key value that failed the check constraint. Rather, DB2 can use the column name and index value used in the DELETE statement to identify, for example, the page containing the row to be deleted and then read only that page to find and delete the row containing the constraint violation. For example, the DELETE statements generated according to an embodiment of the present invention would utilize the column name order_number and the index values contained in column 313 of FIG. 3, which would allow DB2, when executing the DELETE statement, to access the index 140 to identify the RID of the row to be deleted. Accordingly, by generating the DELETE statements in the manner according to an embodiment of the present invention, the need to read millions of rows in a database table has been eliminated and only the rows on the page containing the row to be deleted are read.

Figure 7:
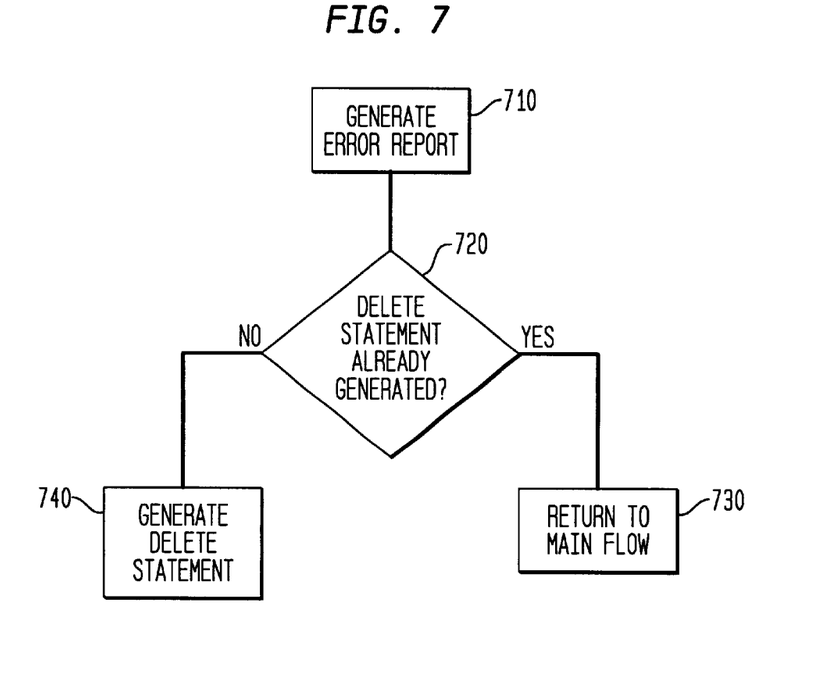
FIG. 7 is another exemplary flowchart for error processing according to an embodiment of the present invention.

FIG. 7 illustrates exemplary error processing according to an embodiment of the present invention when, for example, a referential integrity constraint violation is identified in steps 460 and 470 of FIG. 4. In step 710 of FIG. 7, an error report is generated. The error report can include, for example, a printout of the row identification and value violating the referential integrity constraint, similar to the error report for a check constraint violation. In step 720, the CHECK utility determines if a DELETE statement has already been generated for the row containing the referential integrity constraint violation, for example in the manner described with regard to FIG. 6. If step 720 determines that no DELETE statement has been generated for the row, then a DELETE statement is generated for the row in step 740 using the column name and index value associated with the row and not the particular key value that violated the referential integrity constraint, in the same manner described above with respect to FIG. 6. If a DELETE statement has already been generated, then the CHECK utility returns to the main flow in step 730, for example reading the next row in the database table.

If, for example, the index defined for a database table was not based on a unique value, then the key value that violates the constraint can be used in conjunction with the non-unique index value. For example, if an index was defined for database table 120 based on ship_to_zip, the index value would not uniquely identify a particular row in the table but rather would identify a subset of rows in the table (e.g., all the rows on the table having a particular ship_to_zip value). Thus, a key value violating a constraint, such as customer number=99999, could be combined with the index value for use in generating the SQL DELETE statement in the CHECK utility. For example, the DELETE statement could have the form of:

---
DELETE FROM ORDER _ENTRY
WHERE SHIP_TO_ZIP = "60606" AND
CUSTOMER_NUMBER = "99999";
---

Therefore, utilizing the method for enforcing constraints according to the present invention with a database table having a defined index based on non-unique values, the number of rows to be read can be significantly reduced by generating.

Therefore, utilizing the method for enforcing constraints according to the present invention with a database table having a defined index based on non-unique values, the number of rows to be read can be significantly reduced by generating SQL DELETE statements for rows containing constraint violations utilizing an index value associated with the row. For example, the above example would result in DB2 reading the page containing each row having a ship_to_zip value of 60606 to determine if any such row contained a customer_number of 99999. In contrast, without the method according to the present invention, each row of the database table would have to be read when the DELETE statement was executed instead of only a subset of rows.

What is claimed is:

1. A method for enforcing a constraint in a database table, comprising:

determining if a constraint violation exists in a row of a database table;

if a constraint violation exists, associating an index value of a selected column in the database table with the row containing the constraint violation, the index value corresponding to a value in the selected column of the row containing the constraint violation; and generating a delete statement utilizing the index value to delete the row containing the constraint violation.

2. The method according to claim 1, further comprising determining if the delete statement is to be executed.

3. The method according to claim 1, further comprising executing the delete statement, wherein the executing the deltete statement includes:

locating a page in a tablespace containing the row of the database table having the constraint violation;

locating the row on the page; and deleting the row.

4. The method according to claim 1, wherein the index value includes one of a unique index value and a non-unique index value.

5. The method according to claim 4, wherein when the index value includes a non-unique index value, the generating the delete statement includes generating the delete statement using the non-unique index value and a value causing the constraint violation.

6. The method according to claim 1, further comprising executing the delete statement.

7. The method according to claim 1, wherein the constraint violation includes one of a check violation and a referential integrity constraint violation.

8. A method for enforcing a constraint in a database table, comprising:

initializing a check utility;

determining if a constraint violation exists in a row of a database table;

if a constraint violation exists, associating an index value with the row containing the constraint violation, the index value corresponding to a value in a column of the row containing the constraint violation; and generating a delete statement utilizing the index value.

9. The method according to claim 8, wherein the initializing the check utility includes:

identifying an index defined for the database table, the index including the index value and a row identification for each row of the database table; and identifying a column name of the index for a column including the index value.

10. The method according to claim 9, wherein the generating the delete statement includes generating the delete statement using the column name of the index and the index value for the row violating the constraint.

11. A method for enforcing a constraint in a database table, comprising:

determining if a constraint violation exists in a row of a database table;

if a constraint violation exists, determining if a delete statement has been generated for the row containing the constraint violation; and if the delete statement has not been generated,
associating an index value that corresponds to a value in a column of the row containing the constraint violation; and
generating the delete statement utilizing the index value.

12. The method for inforcing a constraint in a database table as claimed in claim 11, the method further including:
setting a delete statement generated flag for the row containing the constraint violation after the delete statement is generated.

13. The method for enforcing a constraint in a database table as claimed in claim 11, wherein the determining if the delete statement has been generated includes:
determining whether the delete statement generated flag is set for the row containing the constraint violation.

14. The method for enforcing a constraint in a database table as claimed in claim 11, further including:
initializing a check utility prior to determining if a constraint violation exists in a row of a database table.

15. The method for enforcing a constraint as claimed in claim 14, wherein the initializing the check utility includes:
the identifying an index defined for the database table, the index including the index value and a row identification for each row of the database table; and
identifying a column name of the index for a column including the index value.

16. The method for enforcing a constraint in a database table as claimed in claim 1, wherein the predetermined criteria includes frequency of access for a column.

* * * * *